July 25, 1944.   T. W. STEDMAN   2,354,435
PLASTIC FABRIC
Filed Aug. 20, 1941

INVENTOR
Theodore W. Stedman
BY
Ely & Frye
ATTORNEYS

Patented July 25, 1944

2,354,435

UNITED STATES PATENT OFFICE 2,354,435

PLASTIC FABRIC

Theodore W. Stedman, New York, N. Y., assignor to The Firestone Tire & Rubber Company, Akron, Ohio, a corporation of Ohio Application August 20, 1941, Serial No. 407,632

3 Claims. (Cl. 139—420)

This invention relates to improvements in woven fabrics manufactured from mono-filament, synthetic yarns, strands, or strips, composed of materials commonly known as "plastics." This application is a continuation-in-part of my co-pending application, Serial No. 323,917, filed March 14, 1940.

This invention has for an object to provide novel, interstitial fabric structures woven from mono-filament plastic yarns, strands, or strips, said fabric being resiliently flexible, non-stretchable, non-inflammable, durable, abrasion resistant, moisture and acid proof, unaffected by dry cleaning solvents, porous, bright and lustrous.

Another object is to provide a novel plastic fabric woven from mono-filament yarns, strands, or strips, which are pliable non-splintering, tough, non-porous, and having a high tensile strength and high fatigue limit.

A still further object of this invention is to provide a comparative lightweight woven fabric, the weave of which forms a multiplicity of freely open, unfilled interstices throughout its area, so that said fabric is efficiently air pervious; which fabric is composed of interwoven strands of a non-inflammable highly flexible and non-absorptive hardened plastic compound comprising a basic co-polymeric resin and a plasticizer, and which may include desired coloring pigment, dyes, or other coloring matter.

An additional object is to devise a mono-filament strand or strip having one concave surface and one convex surface, and a fabric woven from such concavo-convex strands or strips.

Still another object is to provide a novel fabric woven from mono-filament yarns, strands, or strips composed of a polymeric or co-polymeric resin and a plasticizer.

Another object is to provide a novel fabric woven from mono-filament yarns, strands, or strips composed of one of the group of polymers and conjoint polymers derived from the polymerization of vinylidene chloride, either alone or conjointly with one or more polymerizable vinyl compounds.

An additional object is to provide a novel fabric woven from mono-filament yarns, strands, or strips of extruded, plastic material derived from the polymerization of vinylidene chloride, either alone or conjointly with one or more polymerizable vinyl compounds, in which the molecules of the plastic material are oriented along the axes of the yarns, strands, or strips.

Other objects of this invention, not at this time more particularly enumerated, will be understood from the following detailed description of the same.

Illustrative embodiments of this invention are shown in the accompanying drawing, in which.

Similar characters of reference are employed in the above-described views, to indicate corresponding parts.

Figure 1:
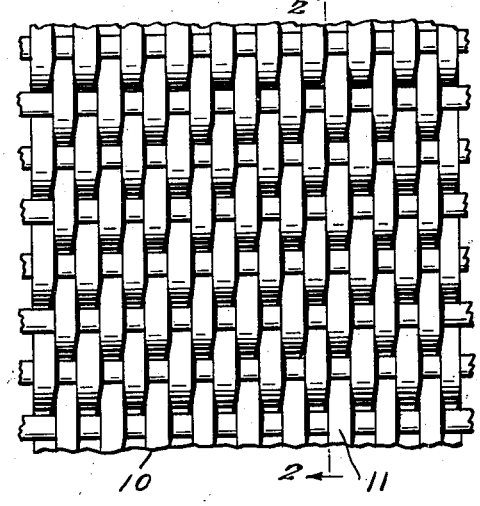
Figure 1 is a plan view of a coarse woven fabric embodying this invention.
Figure 2:
Figure 2 is a sectional view therethrough taken on line 2—2 of Figure 1.

Plastic fabrics have been manufactured heretofore, but, while some of the desirable characteristics enumerated in the objects above have been attained, none of the prior art fabric structures or materials have achieved all of the results or combinations and characteristics which are claimed herein, nor have they achieved the desirable results to the degree attained in the novel fabric disclosed herein.

Substances such as synthetic fiber-forming linear condensation polyamides (commercially known as "nylon"), co-polymers of vinyl chloride with vinyl acetate (commercially known as "Vinylite" or "Vinyon"), cellulose nitrate with camphor or other suitable plasticizer (commercially known as "Celluloid"), cellulose acetate (commercially known as "Tenite"), polymethyl methacrylate (commercially known as "Lucite"), are plastic materials which may have been used heretofore for making woven fabrics. None of these, however, is suitable for the purposes for which the present novel fabric may be employed, because of brittleness, lack of tensile strength, non-ductility, water absorption, solubility, low flex life, inflammability, or stretch.

The class of materials employed in the manufacture of the novel fabric claimed herein are polymeric or co-polymeric resins in combination with suitable plasticizers and stabilizers, with which may be incorporated suitable coloring pigments, dyes, or other coloring material, as desired. In its specific aspects, the preferred material employed in the manufacture of the present novel fabric is the group derived from the polymerization of vinylidene chloride either alone or conjointly with one or more compounds selected from a group which consists of the vinyl halides (of which vinyl chloride is typical), the lower aliphatic esters of vinyl alcohol (of which vinyl acetate is typical), the lower aliphatic esters of methacrylic and acrylic acids (of which methyl methacrylate and ethyl acrylate are typical), and styrene together with its nuclear substituted chlorine derivatives (of which styrene and meta chlorstyrene are typical).

To make the material more readily extrudable and ductile, suitable plasticizers and/or stabilizers are added as well known in the art of vinylidene chloride plastics. The material is then extruded through a die to the desired cross sectional contour, and is then drawn by elongating the extruded strip, while still in a plastic state, to reduce the cross sectional dimension of the strip to the desired size. This drawing action results in an orientation of the fibers or crystals of the material. As distinguished from other common plastics, vinylidene chloride possesses a degree of fibrous crystallinity. Normally, these crystals lie in a random, heterogeneous arrangement, in which condition the plastic is found to have physical properties in the ordinary range of other thermoplastic materials known in the prior art, as set forth above. Partially by the extrusion, and more completely by the drawing and orientation, the fibrous crystals are re-aligned in an orderly linear pattern. When such an extruded, oriented plastic strand is stressed, each crystal theoretically assumes its share of the load and the more desirable physical properties enumerated in the objects above are attained. An important characteristic of the plastic strand or filament thus manufactured is that its desirable qualities, particularly its pliability, are unaffected by all ordinary atmospheric temperature changes. The material thus produced has an unusually high tensile strength. Even large size filaments may thus be produced, having a tensile strength of 60,000 lbs. per sq. in., as well as having great flex life and high fatigue limit. The strands or strips of mono-filaments, so manufactured, are pliable, non-splintering, tough, and non-porous. Preferably, after the strip is extruded, and after it is oriented, the strip is immersed in a water bath to set up and cool the plastic forming the strip.

After extrusion and orientation the filament is allowed to cool and harden and is ready for weaving. The weaving of coarse strips or strands may be carried out on ordinary cane or rattan looms. Wetting of the strands to promote flexibility is avoided, since the material is sufficiently pliable in its natural state, as distinguished from rattan, which must be moistened to render it sufficiently pliable for weaving.

When such mono-filament yarns, strands, or strips are woven, they produce a fabric which is resiliently flexible, non-stretchable, non-inflammable, durable, abrasion resistant, moisture and acid proof, unaffected by dry cleaning solvents, porous, bright, and lustrous. The weave of the material is such that a multiplicity of freely open unfilled interstices are produced throughout its area, so that the fabric is efficiently air pervious, a property which is highly desirable in the manufacture of seat cushion coverings, furniture, and screens. This property may also be utilized in manufacturing the fabric into women's shoes and hats.

Figure 3:
Figure 3 is an enlarged detail cross section of a coarse strand or strip, of which the fabric illustrated in Figure 1 is composed.
Figure 4:
Figure 4 is an enlarged detail cross section of a coarse strand or strip similar to that illustrated in Figure 3, but having a modified cross sectional form.
Figure 5:
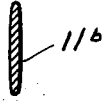
Figure 5 is an enlarged detail cross section of a coarse strand or strip similar to that illustrated in Figure 3 and having still another modified cross sectional form.

Referring now to the drawing in detail, Figure 1 illustrates a coarse fabric 10 embodying the invention. For example, a fabric simulating woven rattan, suitable for seat covering for railway trains, automobile side paneling, furniture covering, automobile seats, and other transportation seating. The mono-filament strips or strands 11 in this fabric may have a plano-convex cross section, as illustrated in Figure 3 of the drawing. In order to make the fabric more resiliently flexible, however, it is preferred that the cross section of strand 11$^a$ be made concavo-convex, as illustrated in Figure 4 of the drawing. On certain types of open mesh fabrics, it may be more desirable to use the modified form of cross section of strand 11$^b$ as illustrated in Figure 5 of the drawing.

Figure 6:
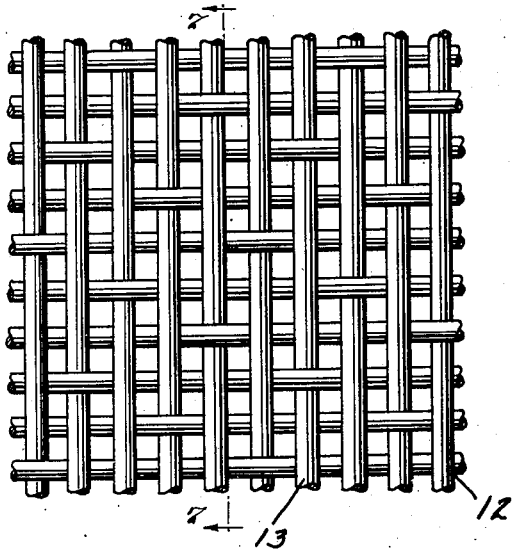
Figure 6 is an enlarged scale plan view of a fine satin woven fabric embodying the invention.
Figure 7:
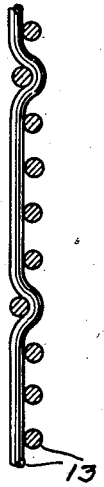
Figure 7 is a sectional view therethrough taken on line 7—7 of Figure 6.

Figure 6 illustrates, in a highly enlarged scale, a satin weave fabric 12 woven from mono-filament yarns 13 of a comparatively fine gauge. Such yarns may be made in sizes from a few thousandths of an inch to one sixteenth inch or larger, according to the type and gauge of fabric to be manufactured. In some cases, it may be desirable to form the yarn from a plurality of filaments. Many different effects may be obtained by plain weaves with various colors, or by solid colors or variegated colors in other types of weaves, such as close weaves and box, twill, drill, and sateen weaves, in addition to the satin weave illustrated in the drawing. Many striped, checkered, and barred effects can be produced by weaving various colors. Intricate patterns and simulated embroidery designs can be produced by weaving the material on a Jacquard loom. The latter materials are suitable for the upholstery of fine automobiles, fine furniture, draperies, curtains, and the like.

Such fabric is stainless, non-inflammable, non-splintering, non-shrinkable, poorly heat conductive, and moisture and acid proof, while at the same time being highly resistant to abrasive, cutting, or like effects, whereby it is very durable, resistant to destruction, and therefore greatly resistant to either willful or accidental injury. By reason of its moisture and acid proof characteristics, and resistance to all common solvents, especially those used for dry cleaning, such novel covering fabric is readily subject to thorough cleaning with water and common cleaning compounds or solutions without risk of injury thereto.

Furthermore, by reason of the ability to incorporate in the material of which it is composed, coloring matter of any desired color, the novel fabric is easily subject to production in selected solid or variegated colors, to the enhancement of the appearance and attractiveness of the environment in which the fabric is employed.

The fabric may be transparent, translucent, or opaque, and may be woven with an open or close weave, box weave, basket weave, or weaves having twill, satin, and jacquard effects. The monofilaments, strips, or strands may be glossy and smooth to make the fabric more readily locally deformable in cooperation with an underlying locally deformable cushion.

Fabrics woven from the coarser strips or strands are particularly applicable to furniture manufacture and seat coverings where it takes the place of reed, rattan, cane, and split bamboo materials formerly used, in which case the surface of the strands may be slightly ridged or corrugated to simulate the natural product. In this application, owing to the unlimited weaving and coloring effects, the use of this novel fabric is especially advantageous. Either simple one color, or more elaborate multi-color designs are readily produced in weaving, making material available for unusual, decorative, and aesthetic effects. The coarser woven material may be effectively utilized as a covering material for luggage, where its durability, attractive appearance, resistance to abrasion, and waterproof characteristics are especially advantageous.

In the finer mono-filament yarn sizes the fabric can be effectively woven with a satin or jacquard figured weave suitable for finer furniture coverings, automobile seat coverings, draperies, curtains, and the like. This finer woven material is also suitable and highly effective for certain types of wearing apparel, such as ladies' hats and shoes.

The examples given of uses for the novel fabric disclosed herein are but a few of the many uses to which it may be put, and it is not intended to limit the utility of the invention to these specific instances, beyond the limitations of the appended claims.

What is claimed is:

1. A fabric woven from mono-filament strands or strips, each of said strands or strips having one concave surface and one convex surface transversely thereof, said strands or strips consisting essentially of a vinylidene chloride copolymer and a plasticizer.

2. A mono-filament strand or strip having one concave surface and one convex surface transversely thereof, said strands or strips consisting essentially of a vinylidene chloride copolymer and a plasticizer.

3. A resilient high tensile strength fabric woven from mono-filament strands or strips of extruded, oriented, plastic material essentially composed of one of the group consisting of a polymer of vinylidene chloride and a co-polymer of vinylidene chloride and another polymerizable vinyl compound, each of said strands or strips being transversely concavo-convex, all of said strands or strips being positioned with their convex surfaces on the outer surface of the fabric.

THEODORE W. STEDMAN.